(12) United States Patent
Hong

(10) Patent No.: US 12,133,273 B2
(45) Date of Patent: Oct. 29, 2024

(54) METHOD AND APPARATUS FOR PROCESSING DATA

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 358 days.

(21) Appl. No.: 17/637,037

(22) PCT Filed: Aug. 23, 2019

(86) PCT No.: PCT/CN2019/102150
§ 371 (c)(1),
(2) Date: Feb. 21, 2022

(87) PCT Pub. No.: WO2021/035381
PCT Pub. Date: Mar. 4, 2021

(65) Prior Publication Data
US 2022/0304080 A1    Sep. 22, 2022

(51) Int. Cl.
*H04W 76/10* (2018.01)
*H04W 8/22* (2009.01)
*H04W 28/02* (2009.01)
*H04W 48/06* (2009.01)

(52) U.S. Cl.
CPC ............ *H04W 76/10* (2018.02); *H04W 8/22* (2013.01); *H04W 28/0236* (2013.01); *H04W 48/06* (2013.01)

(58) Field of Classification Search
CPC .... H04W 8/22; H04W 28/0236; H04W 48/06

USPC ................. 370/329, 400, 403, 396
See application file for complete search history.

(56) References Cited

U.S. PATENT DOCUMENTS

2022/0092276 A1* 3/2022 Tu ........................... G06F 40/30

FOREIGN PATENT DOCUMENTS

| CN | 103366271 A | 10/2013 |
| JP | 2018520596 A | 7/2018 |

OTHER PUBLICATIONS

Indian Patent Application No. 202247014320, Office Action dated Sep. 20, 2022, 5 pages.
European Patent Application No. 19943570.2, Search and Opinion dated May 10, 2023, 14 pages.
(Continued)

*Primary Examiner* — Dang T Ton
(74) *Attorney, Agent, or Firm* — Cozen O'Connor

(57) ABSTRACT

A method for processing data. The method includes: determining whether data to be processed needs to be processed by a network-side device; in response to determining that the data to be processed needs to be processed by the network-side device, sending a request for establishing a connection to the network-side device, wherein, the request carries a purpose of establishing a connection, the purpose is to request the network-side device to process the data to be processed; determining whether the network-side device is capable of processing the data to be processed based on feedback information sent by the network-side device; and in response to the network-side device being capable of processing the data to be processed, sending the data to be processed to the network-side device for processing after establishing a connection with the network-side device.

19 Claims, 10 Drawing Sheets

(56) References Cited

OTHER PUBLICATIONS $3^{rd}$ Generation Partnership Project; Technical Specification Group Radio Access Network; NR; Radio Resource Control (RRC) protocol specification (Release 15), 3GPP TS 38.331, No. v15.6.0, Jun. 2019, 519 pages.

\* cited by examiner

METHOD AND APPARATUS FOR PROCESSING DATA

CROSS-REFERENCE TO RELATED APPLICATION

This application is the US national phase application of International Application No. PCT/CN2019/102150, filed on Aug. 23, 2019, the entire contents of which are incorporated herein by reference.

TECHNICAL FIELD

The disclosure relates to a field of communication technologies, and specifically to a method and an apparatus for processing data, an electronic device and a computer readable storage medium.

BACKGROUND

At present, in the process of communication between a terminal and a network-side device, when data need to be processed, it is completed by the terminal itself, and for the terminal, the network-side device is mainly configured to allocate resources.

However, with the development of science and technology, many types of data increase rapidly, and the volume of data to be processed by the terminal also increases dramatically. When the processing capability of the terminal is not greatly improved, the latency of data processing is relatively high, which may result in user dissatisfaction.

SUMMARY

According to a first aspect of the disclosure, a method for processing data is provided. The method is performed by a terminal, and includes:

determining whether data to be processed needs to be processed by a network-side device;

in response to the data to be processed needing to be processed by the network-side device, sending a request for establishing a connection to the network-side device, wherein, the request carries a purpose of establishing a connection, the purpose being to request the network-side device to process the data to be processed;

determining whether the network-side device is capable of processing the data to be processed based on feedback information sent by the network-side device; and in response to the network-side device being capable of processing the data to be processed, sending the data to be processed to the network-side device for processing after establishing a connection with the network-side device.

According to a second aspect of the disclosure, a method for processing data is provided. The method is performed by a network-side device, and includes:

receiving a request for establishing a connection sent by a terminal, wherein, the request carries a purpose of establishing a connection, the purpose being to request the network-side device to process data to be processed;

sending feedback information to the terminal based on whether being capable of processing the data to be processed;

in response to being capable of processing the data to be processed, receiving the data to be processed after establishing a connection with the terminal;

processing the data to be processed; and sending processed data to the terminal.

According to a third aspect of the disclosure, a terminal is provided, and includes: a processor; and a memory configured to store instructions executable by the processor. The processor is configured to perform the method for processing data as described in any embodiment.

According to a fourth aspect of the disclosure, a network-side device is provided, and includes: a processor; and a memory configured to store instructions executable by the processor. The processor is configured to perform the method for processing data as described in any embodiment.

According to a fifth aspect of embodiments of the disclosure, a computer readable storage medium stored with a computer program thereon is provided. When the program is executed by a processor, steps of the method for processing data applied to a terminal as described in any above embodiment are implemented.

According to a sixth aspect of embodiments of the disclosure, a computer readable storage medium stored with a computer program thereon is provided. When the program is executed by a processor, steps of the method for processing data applied to a network-side device as described in any above embodiment are implemented.

BRIEF DESCRIPTION OF THE DRAWINGS

In order to explain the technical solutions in embodiments of the disclosure more clearly, the drawings used in description of the embodiments will be briefly introduced below. Obviously, the drawings described below are only some embodiments of the disclosure. Those skilled in the art may obtain other drawings from the drawings without creative work.

DETAILED DESCRIPTION

The technical solutions in embodiments of the disclosure will be described clearly and completely below with reference to the accompanying drawings in the embodiments of the disclosure, and obviously, the described embodiments are only a part of the embodiments of the disclosure, rather than all of the embodiments. All other embodiments obtained by those skilled in the art based on the embodiments of the present disclosure without any creative efforts shall be within the protection scope of the present disclosure.

Figure 1:
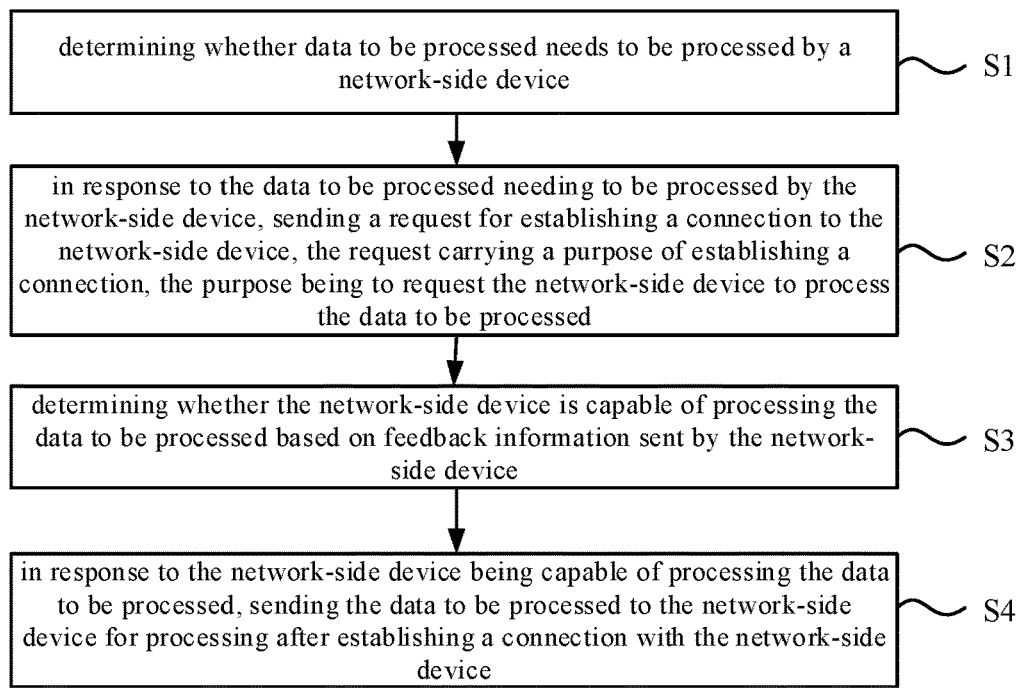
FIG. 1 is a flowchart illustrating a method for processing data according to an embodiment of the disclosure.

FIG. 1 is a flowchart illustrating a method for processing data according to an embodiment of the disclosure. The method for processing data in this embodiment can be applied to a terminal. The terminal may be a mobile phone, a tablet computer and a wearable device. The terminal may communicate with a network-side device as a user equipment, for example, may communicate with a network-side device based on 4G and 5G.

As illustrated in FIG. 1, the method for processing data may include the following steps.

At step S1, it is determined whether data to be processed needs to be processed by a network-side device.

At step S2, in response to the data to be processed needing to be processed by the network-side device, a request for establishing a connection is sent to the network-side device. The request carries a purpose of establishing a connection, and the purpose is to request the network-side device to process the data to be processed.

At step S3, it is determined whether the network-side device is capable of processing the data to be processed based on feedback information sent by the network-side device.

At step S4, in response to the network-side device being capable of processing the data to be processed, the data to be processed is sent to the network-side device for processing after a connection with the network-side device is established.

In an embodiment, when there is data to be processed (that is, data that needs to be processed) in the terminal, it may be first determined whether the data to be processed needs to be processed by the network-side device, which may be a base station or a core network. The way of determining whether the data to be processed needs to be processed by the network-side device may be configured according to requirement, and will described in subsequent embodiments.

In an embodiment, the terminal may be in a disconnected state, for example, an idle state or a non-activated state. When the terminal determines that the data to be processed needs to be processed by the network-side device, the terminal may send the request for establishing a connection to the network-side device, and carry the purpose of establishing a connection in the request, the purpose being to request the network-side device to process data to be processed.

Accordingly, the network-side device, based on the request for establishing a connection, on one hand, can determine that the terminal needs to establish a connection, and on the other hand, can determine the purpose of establishing a connection by the terminal is to request the network-side device to process to data to be processed, that is, to send the data to be processed to the network-side device for processing. Therefore, the network-side device can know the purpose of establishing a connection by the terminal is not to communicate with other terminals, so that the network-side device only needs to determine whether the network-side device itself can process the data to be processed and does not need to query states of other terminals, and based on whether being capable of processing the data to be processed, can generate feedback information to be sent to the terminal.

The terminal can determine whether the network-side device is capable of processing the data to be processed based on the feedback information sent by the network-side device, and in response to the network-side device being capable of processing the data to be processed, send the data to be processed to the network-side device for processing after establishing a connection with the network-side device.

Accordingly, when the network-side device is capable of processing the data to be processed, the data to be processed can be processed by the network-side device, so that the volume of data processed by the terminal is decreased, the load of the terminal is reduced, and the function of the network side device in communication with the terminal is strengthened.

Figure 2:
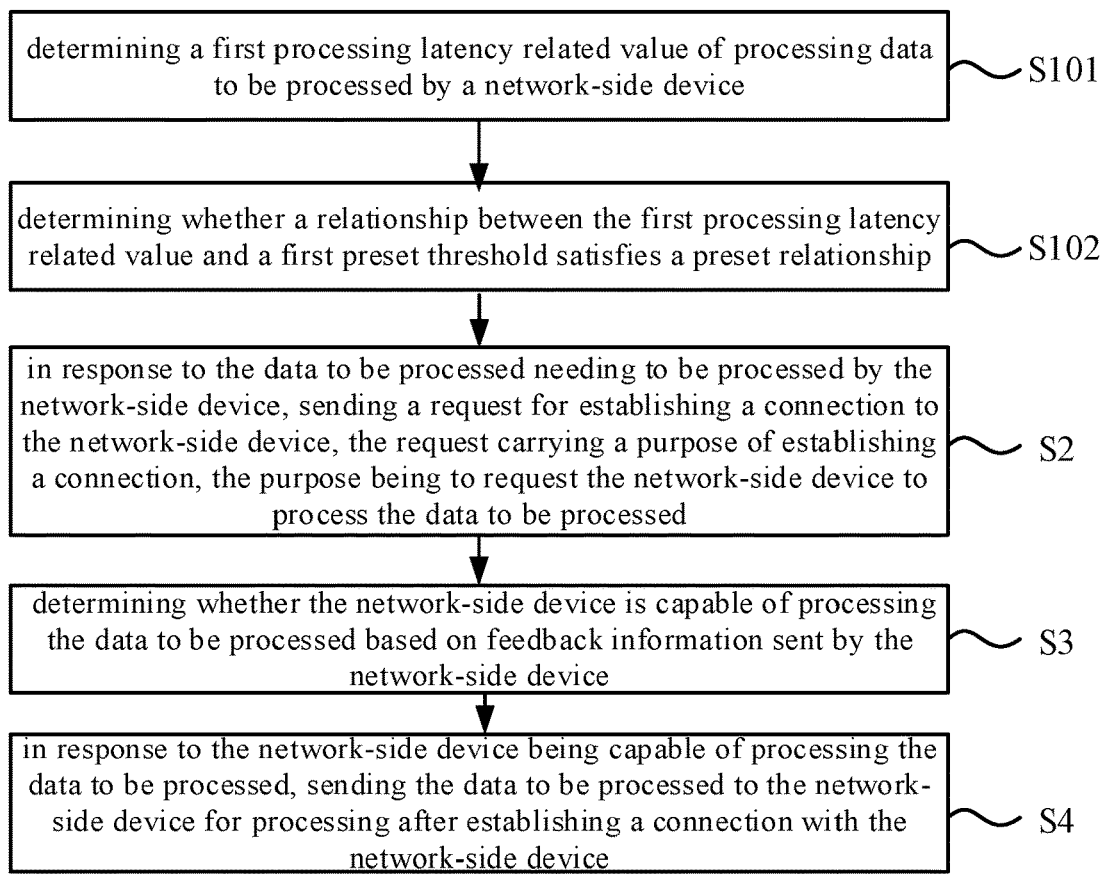
FIG. 2 is a flowchart illustrating another method for processing data according to an embodiment of the disclosure.

FIG. 2 is a flowchart illustrating another method for processing data according to an embodiment of the disclosure. As illustrated in FIG. 2, determining whether the data to be processed needs to be processed by the network-side device, includes followings.

At step S101, a first processing latency related value of processing the data to be processed by the network-side device is determined.

At step S102, it is determined whether a relationship between the first processing latency related value and a first preset threshold satisfies a preset relationship.

In response to the relationship between the first processing latency related value and the first preset threshold satisfying the preset relationship, it is determined that the data to be processed needs to be processed by the network-side device.

In an embodiment, it may be considered whether the data to be processed needs to be processed by the network-side device from the perspective of the processing latency of processing the data to be processed by the network-side device. Specifically, in response to the relationship between the first processing latency related value of processing the data to be processed by the network-side device and the first preset threshold satisfying the preset relationship, it can be determined that the data to be processed needs to be processed by the network-side device. Accordingly, it can be ensured that the data to be processed is sent to the network-side device for processing, which may satisfy the latency requirement, reduce the latency the terminal's user feels and ensure the user's good experience.

In an embodiment, the first processing latency related value includes a processing latency or a processing speed.

In an embodiment, for example, the first processing latency related value is the processing latency itself, the preset threshold may be a preset duration, and the preset relationship may be that the processing latency is less than the preset duration. For example, the first processing latency related value is the processing speed, the preset threshold may be a preset speed, and the preset relationship may be that the processing speed is greater than the preset speed.

According to embodiments of the disclosure, when the relationship between the first processing latency related value and the preset threshold satisfies the preset relationship, for example, the processing latency is less than the preset duration, or the processing speed is greater than the preset speed, it can be determined that the latency caused by processing the data to be processed by the network-side device is relatively low, and easily satisfies the low-latency requirement of the user, and then it can be determined that the data to be processed needs to be processed by the network-side device.

It should be noted that, the terminal can predict the first processing latency related value of processing the data to be processed by the network-side device based on historical latency related values of processing data by the network-side device, for example, calculate a mean value for the first processing latency related values of a plurality of times of processing data, or the network-side device may send the capability information of processing data such as the processing speed by itself to the terminal, so that the terminal determines the first processing latency related value based on the capability information.

In addition, the latency caused by processing the data to be processed by the network-side device for processing not only relies on that the network-side device processes data to be processed, but also a certain latency exists when the data to be processed is sent to the network-side device and the processed data is received from the network-side device.

Therefore, from the perspective of processing time, for determining whether the processing latency is less than the preset duration, a first latency of sending the data to be processed to the network-side device, a second latency of processing the data to be processed by the network-side device, and a third latency of receiving processed data from the network-side device after processing the data to be processed may be determined, and then it may be determined whether a sum of the first latency, the second latency and the third latency is less than the preset latency.

Accordingly, for determining the processing latency, not only the second latency of processing the data to be processed by the network-side device may be considered, but also the first latency of sending the data to be processed to the network-side device and the third latency of receiving processed data from the network-side device after processing the data to be processed may be considered, so as to accurately determine the processing latency.

From the perspective of the processing speed, for determining whether the processing speed is greater than a preset speed, a first speed of sending data to be processed to the network-side device, a second speed of processing the data to be processed by the network-side device, and a third speed of receiving processed data from the network-side device after processing the data to be processed may be determined; and then it may be determined whether a mean value of the first speed, the second speed and the third speed is greater than the preset speed.

Accordingly, for determining the processing speed, not only the second speed of processing the data to be processed by the network-side device may be considered, but also the first speed of sending the data to be processed to the network-side device and the third speed of receiving processed data from the network-side device after processing the data to be processed may be considered, so as to accurately determine the processing speed.

Figure 3:
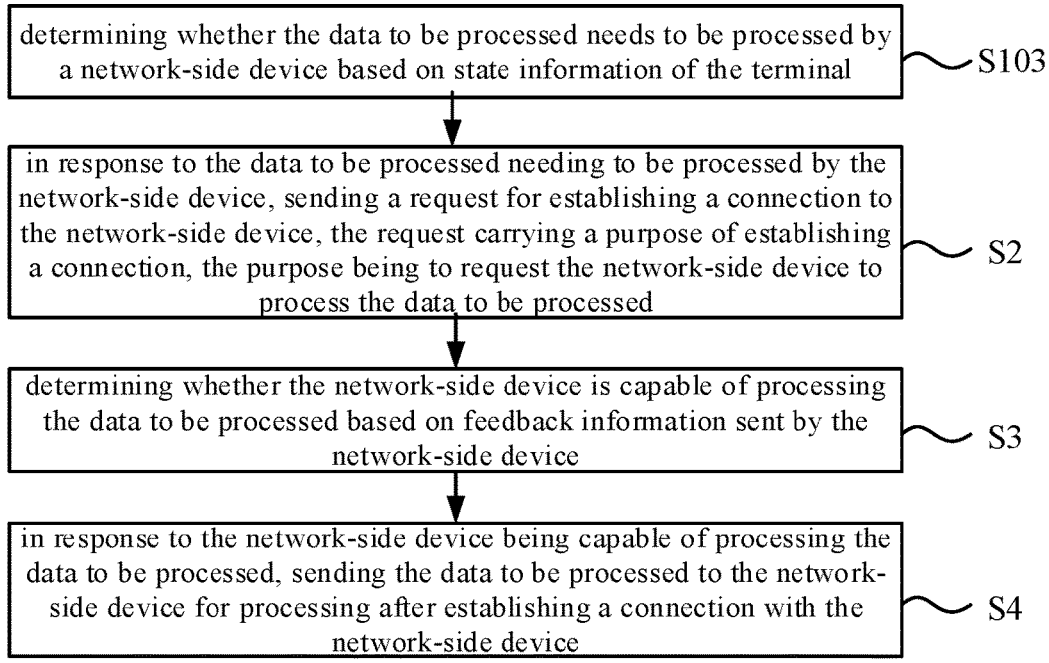
FIG. 3 is a flowchart illustrating yet another method for processing data according to an embodiment of the disclosure.

FIG. 3 is a flowchart illustrating yet another method for processing data according to an embodiment of the disclosure. As illustrated in FIG. 3, determining whether the data to be processed needs to be processed by the network-side device includes:

at step S103, determining whether the data to be processed needs to be processed by the network-side device based on state information of the terminal.

In an embodiment, the state information includes at least one of: electric quantity, and processor load.

In an embodiment, it may be determined whether the data to be processed needs to be processed by the network-side device based on the state information of the terminal. The state information of the terminal may include electric quantity, processor load, etc. Taking the electric quantity as an example, when the electric quantity is lower than a preset electric quantity, it may be determined that the data to be processed needs to be processed by the network-side device; taking the processor load as an example, when the processor load is higher than a preset load, it may be determined that the data to be processed needs to be processed by the network-side device.

The state information of the terminal itself may reflect the capability of the terminal in certain aspects to a certain extent. For example, when the processor load is relatively high, the capability of processing the data to be processed may be relatively low. For example, when the electric quantity is low, the endurance capability of the terminal may be relatively low.

In the embodiment, the capability of the terminal may be measured based on the state information of the terminal, and further whether the data to be processed needs to be sent to the network-side device for processing may be determined based on the state information of the terminal, and in response to determining that the data to be processed needs to be processed by the network-side device, the network-side device is requested to process the data to be processed, so that the data to be processed is sent to the network-side device for processing, to ensure that the terminal has good performance, and the data to be processed may be processed in time.

Figure 4:
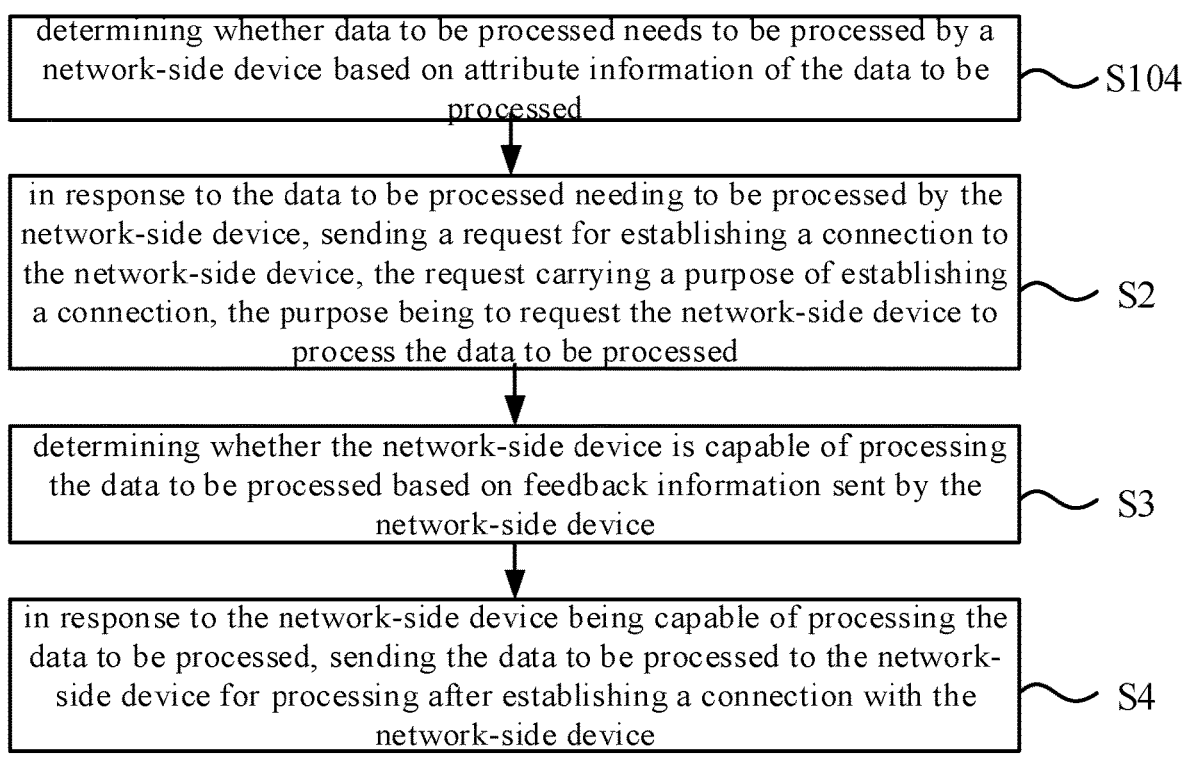
FIG. 4 is a flowchart illustrating still another method for processing data according to an embodiment of the disclosure.

FIG. 4 is a flowchart illustrating still another method for processing data according to an embodiment of the disclosure. As illustrated in FIG. 4, determining whether the data to be processed needs to be processed by the network-side device includes:

at step S104, determining whether the data to be processed needs to be processed by the network-side device based on attribute information of data to be processed.

In an embodiment, the attribute information includes at least one of: data volume, and data type.

In an embodiment, it may be determined whether the data to be processed needs to be processed by the network-side device based on the attribute information of the data to be processed. The attribute information of the data to be processed may include data volume, data type, etc. Taking data volume as an example, when the data volume is greater than a preset data volume, it may be determined that the data to be processed needs to be processed by the network-side device; taking data type as an example, when the data type belongs to data that needs to be processed by the machine learning model, it may be determined that the data to be processed needs to be processed by the network-side device.

The attribute information of the data to be processed may reflect an overhead of processing the data to be processed by the terminal to a certain extent. For example, when the data volume is relatively large, the overhead of processing the data to be processed by the terminal is relatively large, and the latency caused hereby may be relatively high. For example, when the data type belongs to data that needs to be processed by the machine learning model, then for processing the data to be processed, the terminal needs to perform machine learning based on a large amount of sample data to obtain the model, the overhead of which is relatively large.

In this embodiment, the overhead of processing the data to be processed by the terminal may be measured based on the attribute information of the data to be processed, and further whether the data to be processed needs to be sent to the network-side device for processing may be determined based on the attribute information of the data to be processed, and in response to determining that the data to be processed needs to be processed by the network-side device, the network-side device is requested to process data to be processed, so that the data to be processed is sent to the network-side device for processing, thus avoiding excessive overhead of the terminal and ensuring that the data to be processed can be processed in time.

In an embodiment, the request further carries data volume of the data to be processed.

In an embodiment, the terminal may further carry the data volume of the data to be processed in sending the request for establishing a connection, so that the network-side device may determine whether it is capable of processing the data to be processed based on the data volume of the data to be processed, for example, may determine a second processing latency related value of processing the data to be processed based on the data volume. The second processing latency related value also may be the processing latency or the processing speed. Further, the network-side device may determine whether the relationship between the second processing latency related value and a second preset threshold satisfies a preset relationship, and when the relationship between the second processing latency related value and the second preset threshold satisfies the preset relationship, being capable of processing the data to be processed can be determined.

The second preset threshold configured to be compared with the second processing latency related value may be prestored in the network-side device, and also may be carried in the request and sent by the terminal to the network-side device.

In an embodiment, the request further carries the second preset threshold, and the second preset threshold is configured for the network-side device to compare the second preset threshold with the first processing latency related value of processing data to be processed by the network-side device, to obtain the feedback information.

In an embodiment, by sending the second preset threshold carried in the request to the network-side device, the terminal may indicate the second preset threshold configured to be compared with the second processing latency related value to the network-side device, so that the degree of determining whether the network-side device is capable of processing the data to be processed can be adjusted.

Figure 5:
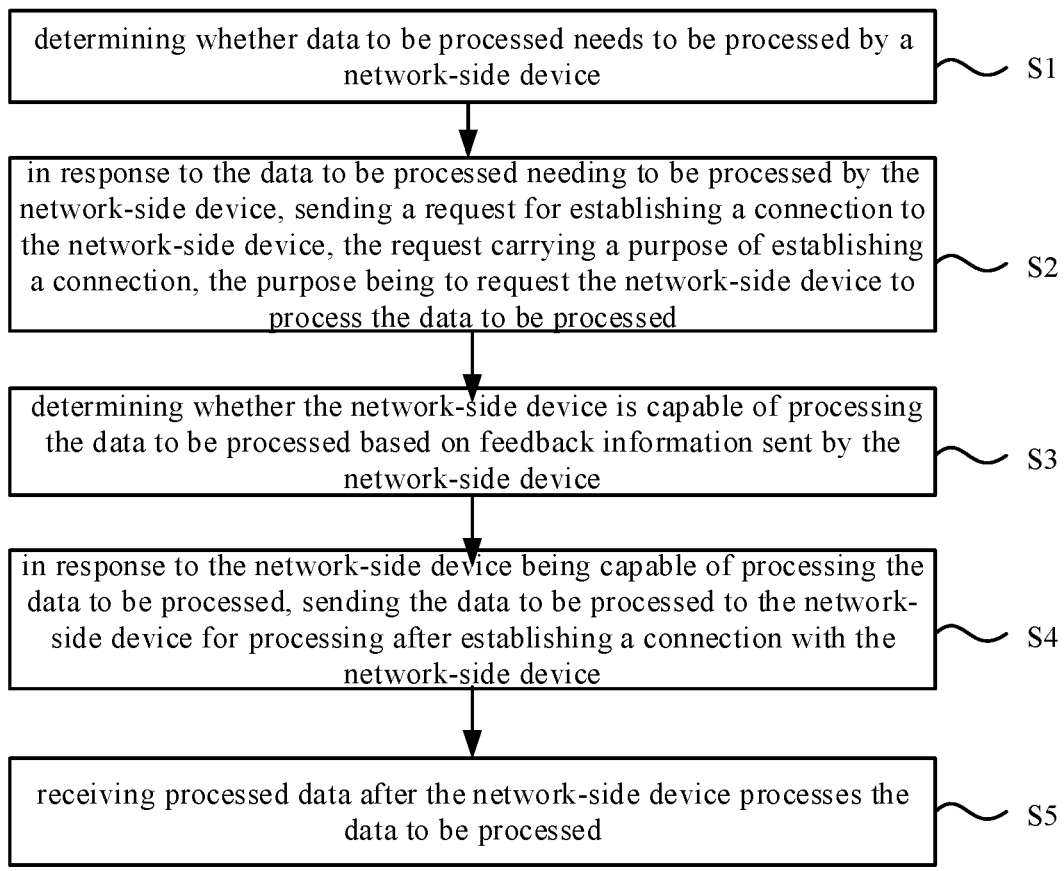
FIG. 5 is a flowchart illustrating still yet another method for processing data according to an embodiment of the disclosure.

FIG. 5 is a flowchart illustrating still yet another method for processing data according to an embodiment of the disclosure. As illustrated in FIG. 5, the method further includes:

at step S5, receiving processed data after the network-side device processes the data to be processed.

In an embodiment, the network-side device may send the processed data to the terminal, and the terminal may receive the processed data after the network-side device processes the data to be processed.

In an embodiment, the network-side device includes at least one of: a base station, and a core network.

Figure 6:
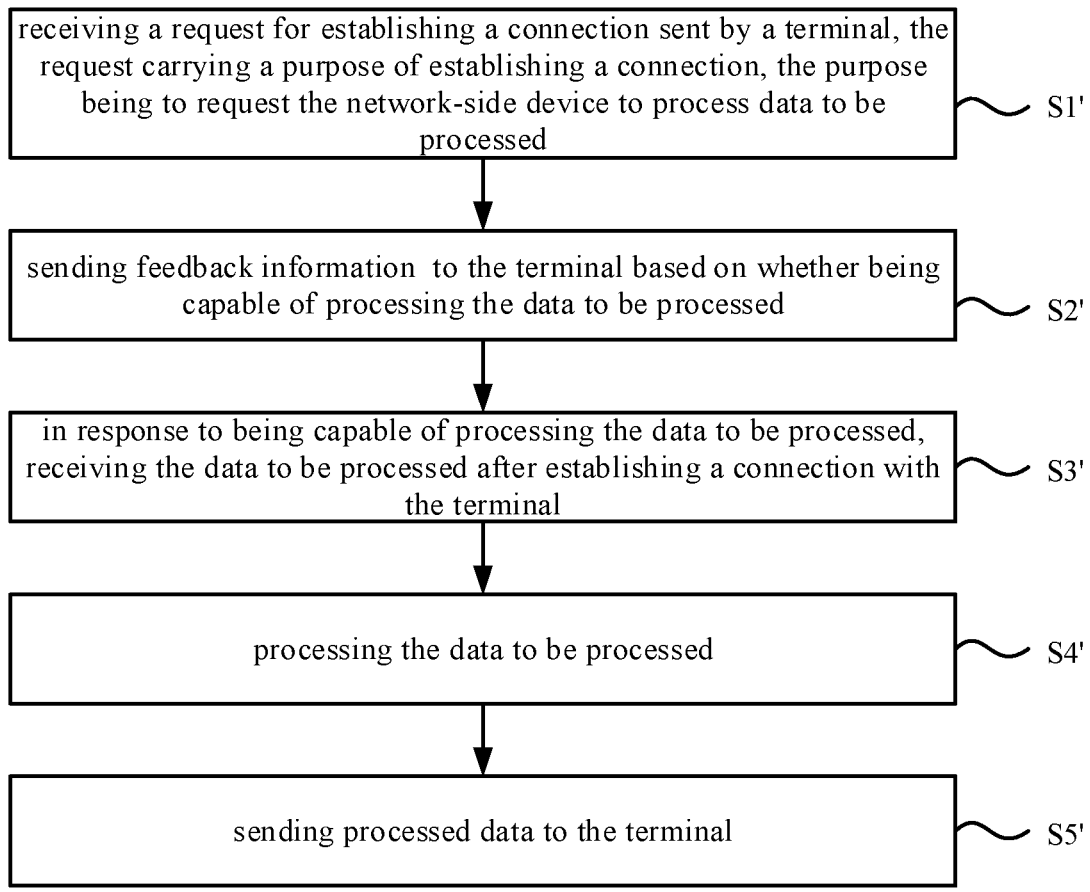
FIG. 6 is a flowchart illustrating a method for processing data according to an embodiment of the disclosure.

FIG. 6 is a flowchart illustrating a method for processing data according to an embodiment of the disclosure. The method for processing data as illustrated in this embodiment can be applied to a network-side device. The network-side device may communicate with a terminal as a user equipment, for example, may communicate with the terminal based on 4G and 5G, and the terminal may be an electronic device such as a mobile phone, a tablet computer, a wearable device.

As illustrated in FIG. 6, the method for processing data may include the following steps.

At step S1', a request for establishing a connection sent by a terminal is received, the request carrying a purpose of establishing a connection, the purpose being to request the network-side device to process data to be processed.

At step S2', feedback information is sent to the terminal based on whether being capable of processing the data to be processed.

At step S3', in response to being capable of processing the data to be processed, the data to be processed is received after a connection with the terminal is established.

At step S4', the data to be processed is processed.

At step S5', processed data is sent to the terminal.

In an embodiment, when the terminal determines that the data to be processed needs to be processed by the network-side device, the terminal may send the request for establishing a connection to the network-side device, and carry the purpose of establishing the connection in the request, the purpose being to request the network-side device to process data to be processed.

The network-side device may determine whether it is capable of processing the data to be processed, and send feedback information to the terminal based on whether being capable of processing the data to be processed. The feedback information may be a paging signaling, a system message, etc.

Taking a paging signaling as an example, the paging signaling may carry an identifier of the terminal and information of whether being capable of processing the data to be processed, so that the terminal may determine that the paging signaling is sent to the terminal after receiving the paging signaling, and further, may determine whether the network-side device is capable of processing data to be processed based on the information of whether being capable of processing data to be processed in the paging signaling.

Further, when the network-side device is capable of processing the data to be processed, the terminal may be allowed to establish a connection in the feedback information, and when the network-side device is incapable of processing the data to be processed, the request to establish a connection may be refused in the feedback information.

When the network-side device is capable of processing data to be processed, the terminal can send the data to be processed to the network-side device for processing, so that the volume of data processed by the terminal is decreased, the load of the terminal is reduced, and the function of the network side device in communication with the terminal is strengthened.

Figure 7:
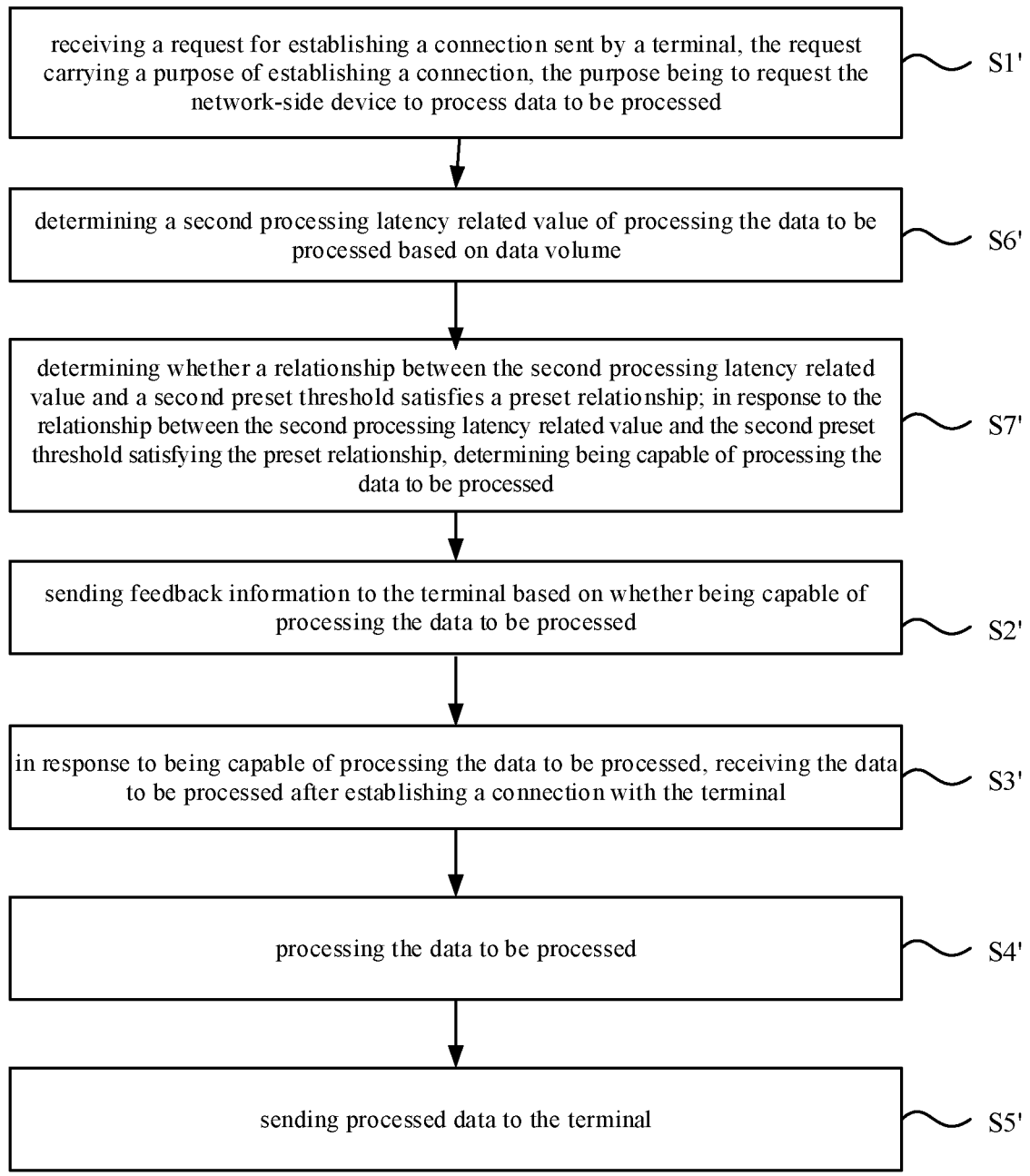
FIG. 7 is a flowchart illustrating another method for processing data according to an embodiment of the disclosure.

FIG. 7 is a flowchart illustrating another method for processing data according to an embodiment of the disclosure. As illustrated in FIG. 7, the request further carries data volume of the data to be processed, and before sending the feedback information to the terminal based on whether being capable of processing the data to be processed, the method further includes:

at step S6', determining a second processing latency related value of processing the data to be processed based on the data volume; and at step S7', determining whether a relationship between the second processing latency related value and a second preset threshold satisfies a preset relationship.

In response to the relationship between the second processing latency related value and the second preset threshold satisfying the preset relationship, being capable of processing the data to be processed can be determined.

In an embodiment, the terminal may further carry the data volume of the data to be processed in sending the request for establishing a connection, so that the network-side device can determine whether it is capable of processing the data to be processed based on the data volume of the data to be processed, for example, may determine the second processing latency related value of processing the data to be processed based on the data volume. The second processing latency related value also may be the processing latency itself or the processing speed. Further, the network-side device can determine whether the relationship between the second processing latency related value and the second preset threshold satisfies the preset relationship, and when the relationship between the second processing latency related value and the second preset threshold satisfies the preset relationship, being capable of processing the data to be processed can be determined.

The second preset threshold configured to be compared with the second processing latency related value may be prestored in the network-side device, and also may be carried in the request and sent by the terminal to the network-side device.

In an embodiment, the request further carries the second preset threshold.

In an embodiment, the terminal may further send the second preset threshold carried in the request to the network-side device, so that the terminal may indicate the second preset threshold configured to be compared with the second processing latency related value to the network-side device, so that the degree of determining whether the network-side device is capable of processing the data to be processed can be adjusted.

In an embodiment, in response to being incapable of processing the data to be processed, the feedback information is configured to refuse the request.

In an embodiment, when the network-side device determines that it is incapable of processing data to be processed, the request of establishing a connection may be rejected by the feedback information, thus avoiding waste of communication resources caused by sending the data to be processed to the network-side device by the terminal and the network-side device being incapable of processing the data to be processed.

In an embodiment, the feedback information further carries a reason of refusing the request.

In an embodiment, when the network-side device determines that it is incapable of processing data to be processed, the feedback information may further carry a reason of refusing the request for the terminal to establish a connection. For example, the reason is that the network-side device is incapable of processing the data to be processed. The terminal may know that the network-side device refuses to establish a connection due to being incapable of processing the data to be processed, so that the terminal may select other purposes to establish a connection with the network-side device.

In an embodiment, the network-side device includes at least one of: a base station, and a core network.

Corresponding to embodiments of the method for processing data applied to a terminal and the method for processing data applied to a network-side device, the disclosure further provides embodiments of an apparatus for processing data applied to a terminal and an apparatus for processing data applied to a network-side device.

Figure 8:
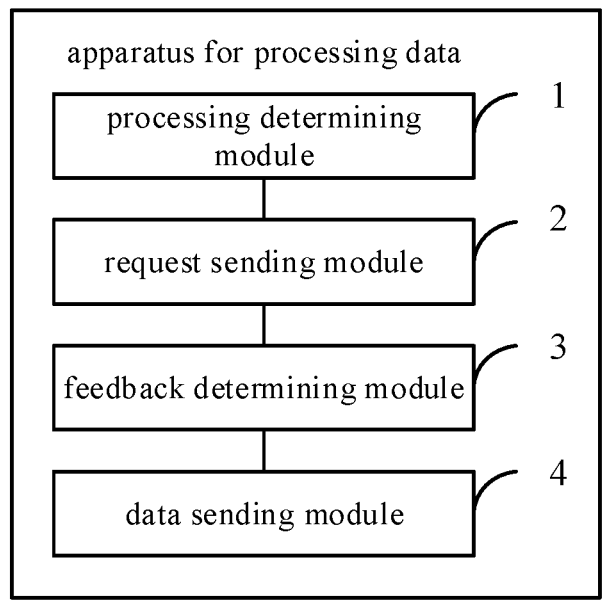
FIG. 8 is a schematic block diagram illustrating an apparatus for processing data according to an embodiment of the disclosure.

FIG. 8 is a schematic block diagram illustrating an apparatus for processing data according to an embodiment of the disclosure. The apparatus for processing data in this embodiment can be applied to a terminal. The terminal may be a mobile phone, a tablet computer and a wearable device. The terminal may communicate with a network-side device as a user equipment, for example, may communicate with the network-side device based on 4G and 5G.

As illustrated in FIG. 8, the apparatus for processing data may include a processing determining module 1, a request sending module 2, a feedback determining module 3 and a data sending module 4.

The processing determining module 1 is configured to determine whether data to be processed needs to be processed by a network-side device.

The request sending module 2 is configured to, in response to the data to be processed needing to be processed by the network-side device, send a request for establishing a connection to the network-side device. The request carries a purpose of establishing a connection, and the purpose is to request the network-side device to process the data to be processed.

The feedback determining module 3 is configured to determine whether the network-side device is capable of processing the data to be processed based on feedback information sent by the network-side device.

The data sending module 4 is configured to, in response to the network-side device being capable of processing the data to be processed, send the data to be processed to the network-side device for processing after establishing a connection with the network-side device.

Figure 8A:
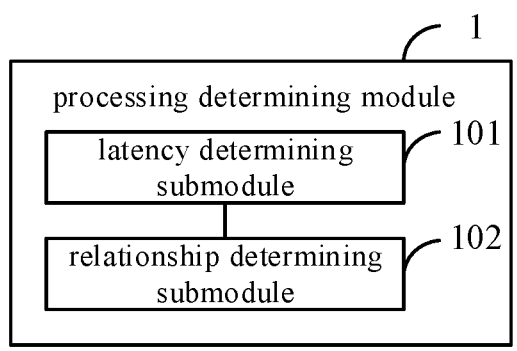
FIG. 8A is a schematic block diagram illustrating a processing determining module according to an embodiment of the disclosure.

FIG. 8A is a schematic block diagram illustrating a processing determining module according to an embodiment of the disclosure. As illustrated in FIG. 8A, the processing determining module 1 includes a latency determining submodule 101 and a relationship determining submodule 102.

The latency determining submodule 101 is configured to determine a first processing latency related value of processing data to be processed by the network-side device.

The relationship determining submodule 102 is configured to determine whether a relationship between the first processing latency related value and a first preset threshold satisfies a preset relationship.

In response to the relationship between the first processing latency related value and the first preset threshold satisfying the preset relationship, it is determined that the data to be processed needs to be processed by the network-side device.

In an embodiment, the first processing latency related value includes a processing latency or a processing speed.

In an embodiment, the processing determining module is configured to determine whether the data to be processed needs to be processed by the network-side device based on state information of the terminal.

In an embodiment, the state information includes at least one of: electric quantity, and processor load.

In an embodiment, the processing determining module, is configured to determine whether the data to be processed needs to be processed by the network-side device based on attribute information of the data to be processed.

In an embodiment, the attribute information includes at least one of: data volume, and data type.

In an embodiment, the request further carries data volume of the data to be processed.

In an embodiment, the request further carries a second preset threshold. The second preset threshold is configured for the network-side device to compare the second preset threshold with the first processing latency related value of processing data to be processed by the network-side device, to obtain the feedback information.

Figure 9:
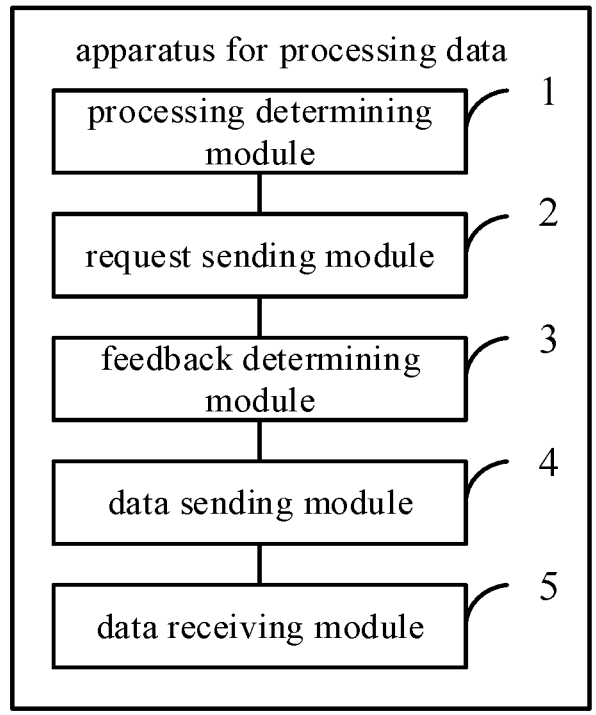
FIG. 9 is a schematic block diagram illustrating another apparatus for processing data according to an embodiment of the disclosure.

FIG. 9 is a schematic block diagram illustrating another apparatus for processing data according to an embodiment of the disclosure. As illustrated in FIG. 9, the apparatus further includes: a data receiving module 5, configured to receive processed data after the network-side device processes the data to be processed.

In an embodiment, the network-side device includes at least one of: a base station, and a core network.

Figure 10:
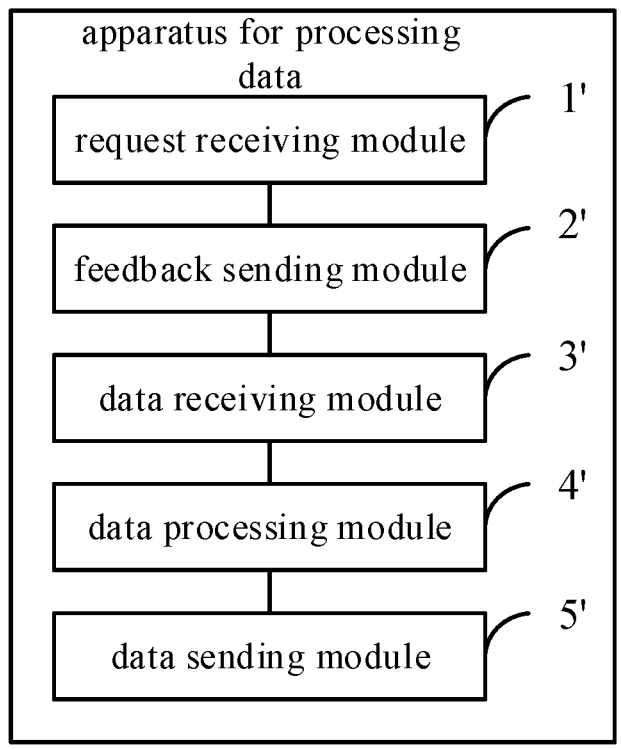
FIG. 10 is a schematic block diagram illustrating an apparatus for processing data according to an embodiment of the disclosure.

FIG. 10 is a schematic block diagram illustrating an apparatus for processing data according to an embodiment of the disclosure. The apparatus for processing data as illustrated in the embodiment can be applied to a network-side device. The network-side device may communicate with a terminal as a user equipment, for example, may communicate with the terminal based on 4G and 5G, and the terminal may be an electronic device such as a mobile phone, a tablet computer, a wearable device.

As illustrated in FIG. 10, the apparatus for processing data may include: a request receiving module 1', a feedback sending module 2', a data receiving module 3', a data processing module 4' and a data sending module 5'.

The request receiving module 1' is configured to receive a request for establishing a connection sent by a terminal. The request carries a purpose of establishing a connection, and the purpose is to request the network-side device to process data to be processed.

The feedback sending module 2' is configured to send feedback information to the terminal based on whether being capable of processing the data to be processed.

The data receiving module 3' is configured to, in response to being capable of processing the data to be processed, receive the data to be processed after establishing a connection with the terminal.

The data processing module 4' is configured to process the data to be processed.

The data sending module 5' is configured to send processed data to the terminal.

Figure 11:
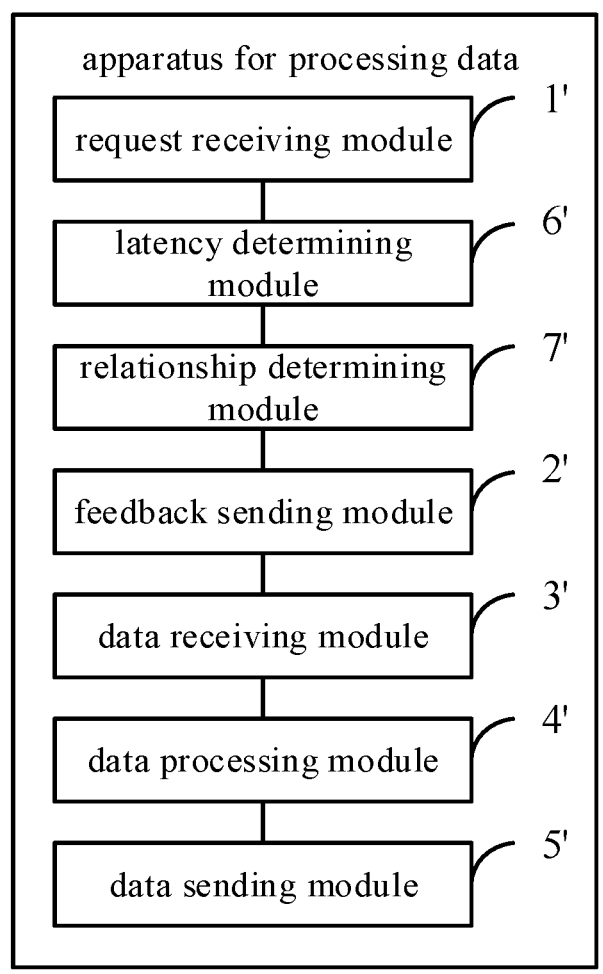
FIG. 11 is a schematic block diagram illustrating another apparatus for processing data according to an embodiment of the disclosure.

FIG. 11 is a schematic block diagram illustrating another apparatus for processing data according to an embodiment of the disclosure. As illustrated in FIG. 11, the request further carries data volume of the data to be processed. The apparatus further includes: a latency determining module 6' and a relationship determining module 7'.

The latency determining module 6' is configured to determine a first processing latency related value of processing the data to be processed based on the data volume.

The relationship determining module 7' is configured to determine whether a relationship between the first processing latency related value and a second preset threshold satisfies a preset relationship.

In response to the relationship between the first processing latency related value and the second preset threshold satisfying the preset relationship, being capable of processing the data to be processed can be determined.

In an embodiment, the request further carries the second preset threshold.

In an embodiment, in response to being incapable of processing the data to be processed, the feedback information is configured to refuse the request.

In an embodiment, the feedback information further carries a reason of refusing the request.

In an embodiment, the network-side device includes at least one of: a base station, and a core network.

With regard to the apparatus in the embodiments, the specific way each module performs operation has been described in detail in the embodiments of the method and will not be elaborated here.

Since the apparatus embodiments basically correspond to the method embodiments, please refer to part of description of the method embodiments for relevant information. The above apparatus embodiments are merely schematic, the modules described as separate components may or may not be physically separated, and components displayed as modules may or may not be physical modules, that is, may be located in one place, or may be distributed on a plurality of network modules. Some or all of the modules may be selected according to actual requirements to achieve the solutions in the embodiments. Those skilled in the art may understand and implement the method without any creative effort.

Embodiments of the disclosure further provide an electronic device. The electronic device includes: a processor; and a memory configured to store instructions executable by the processor. The processor is configured to perform the method for processing data applied to a terminal as described in any embodiment.

Embodiments of the disclosure further provide an electronic device. The electronic device includes: a processor; and a memory configured to store instructions executable by the processor. The processor is configured to perform the method for processing data applied to a network-side device as described in any embodiment.

Embodiments of the disclosure further provide a computer readable storage medium stored with a computer program thereon. When the computer program is executed by a processor, steps of the method for processing data applied to the terminal as described in any above embodiment are implemented.

Embodiments of the disclosure further provide a computer readable storage medium stored with a computer program thereon. When the computer program is executed by a processor, steps of the method for processing data applied to the network-side device as described in any above embodiment are implemented.

Figure 12:
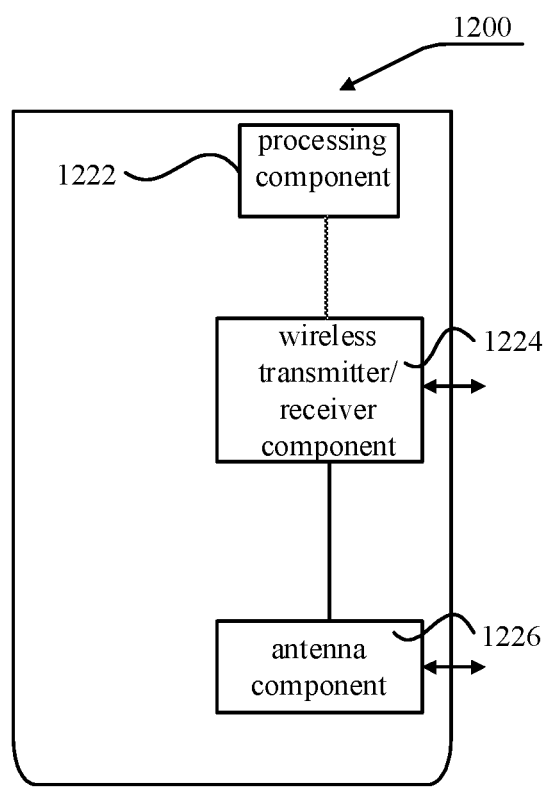
FIG. 12 is a schematic block diagram illustrating an apparatus for processing data according to an embodiment of the disclosure.

FIG. 12 is a schematic block diagram illustrating an apparatus 1200 for processing data according to an embodiment of the disclosure. The apparatus 1200 may be provided as a network-side device. As illustrated in FIG. 12, the apparatus 1200 includes a processing component 1222, a wireless transmitter/receiver component 1224, an antenna component 1226 and a signal processing part peculiar to a wireless interface. The processing component 1222 may further include one or more processors. One processor of the processing component 1222 is configured to implement the method for processing data applied to a base station as described in any above embodiment.

Figure 13:
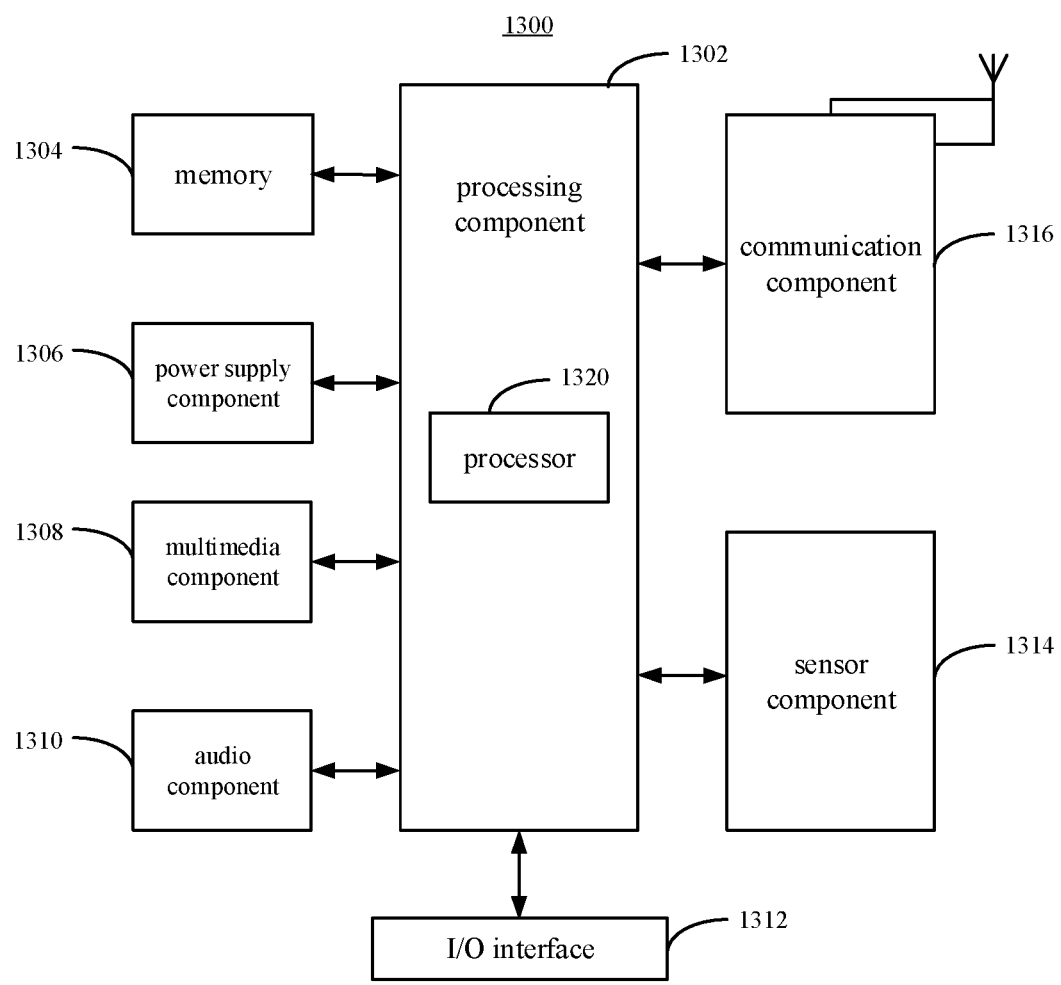
FIG. 13 is a schematic block diagram illustrating an apparatus for processing data according to an embodiment of the disclosure.

FIG. 13 is a schematic block diagram illustrating an apparatus 1300 for processing data according to an embodiment of the disclosure. For example, the apparatus 1300 may be a mobile phone, a computer, a digital broadcasting terminal, a messaging device, a game console, a tablet device, a medical equipment, a fitness equipment, a personal digital assistant, etc.

As illustrated in FIG. 13, the apparatus 1300 may include one or more of following components: a processing component 1302, a memory 1304, a power supply component 1306, a multimedia component 1308, an audio component 1310, an input/output (I/O) interface 1312, a sensor component 1314, and a communication component 1316.

The processing component 1302 generally controls the whole operation of the apparatus 1300, such as the operations related to display, phone call, data communication, camera operation and recording operation. The processing component 1302 may include one or more processors 1320 to perform instructions, to complete all or part of blocks of the above method. In addition, the processing component 1302 may include one or more modules for the convenience of interaction between the processing component 1302 and other components. For example, the processing component 1302 may include a multimedia module for the convenience of interaction between the multimedia component 1308 and the processing component 1302.

The memory 1304 is configured to store all types of data to support the operation of the apparatus 1300. Examples of the data include the instructions of any applications or methods operated on the apparatus 1300, contact data, phone book data, messages, pictures, videos, etc. The memory 1304 may be implemented by any type of volatile or non-volatile storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 1306 may provide power for all components of the apparatus 1300. The power supply component 1306 may include power supply management system, one or more power supplies, and other units related to generating, managing and distributing power for the apparatus 1300.

The multimedia component 1308 includes an output interface screen provided between the device 1300 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touch, slide and gestures on the touch panel. The touch sensor may not only sense the boundary of the touch or slide action, but also detect the duration and pressure related to the touch or slide operation. In some embodiments, the multimedia component 1308 includes a front camera and/or a rear camera. When the apparatus 1300 is in an operation mode, such as a shooting mode or a video mode, the front camera and/or the rear camera may receive external multimedia data. Each front camera and rear camera may be a fixed optical lens system or an optical lens system with a focal length and an optical zoom capacity.

The audio component 1310 is configured to output and/or input an audio signal. For example, the audio component 1310 includes a microphone (MIC). When the apparatus 1300 is in operation mode, such as call mode, record mode, and speech recognition mode, the microphone is configured to receive the external audio signals. The audio signal received may be further stored in the memory 1304 or sent via the communication component 1316. In some embodiments, the audio component 1310 further includes a speaker configured to output an audio signal.

The I/O interface 1312 provides an interface for the processing component 1302 and the peripheral interface module, and the peripheral interface module may be a keyboard, a click wheel, a button, etc. The buttons may include but not limited to a home button, a volume button, a start button and a lock button.

The sensor component 1314 includes one or more sensors, configured to provide various aspects of status assessment for the apparatus 1300. For example, the sensor component 1314 may detect the on/off state of the apparatus 1300 and the relative positioning of the component. For example, the component is a display and a keypad of the apparatus 1300. The sensor component 1314 may further detect the position change of the apparatus 1300 or one component of the apparatus 1300, the presence or absence of contact between the user and the apparatus 1300, the orientation or acceleration/deceleration of the apparatus 1300, and the temperature change of the apparatus 1300. The sensor component 1314 may include a proximity sensor configured to detect the existence of the objects nearby without any physical contact. The sensor component 1314 may further include a light sensor such as CMOS or CCD image sensor, which is configured to use in imaging applications. In some embodiments, the sensor component 1314 may further include an acceleration transducer, a gyroscope sensor, a magnetic sensor, a pressure sensor or a temperature sensor.

The communication component 1316 is configured for the convenience of wire or wireless communication between the apparatus 1300 and other devices. The apparatus 1300 may access wireless networks based on a communication standard, such as WiFi, 2G or 3G, 4G LTE, 5G NR or their combination. In an embodiment, the communication component 1316 receives a broadcast signal or broadcast-related information from an external broadcast management system via a broadcast channel. In an embodiment, the communication component 1316 further includes a near field communication (NFC) module to facilitate short-range communication. For example, the NFC module may be achieved based on an RFID technology, an IrDA technology, a UWB technology, a BT technology and other technologies.

In an example embodiment, the apparatus 1300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, to perform the method for processing data applied to a terminal as described in the above any embodiment.

In an embodiment, a non-transitory computer readable storage medium including instructions is further provided, such as a memory 1304 including instructions, the instructions may be executed by the processor 1320 of the apparatus 1300 to complete the above method. For example, the non-transitory computer readable storage medium may be a ROM, a random access memory (RAM), a CD-ROM, a magnetic tape, a floppy disk, an optical data storage device, etc.

After considering the specification and practicing the disclosure herein, those skilled in the art will easily think of other embodiments of the present application. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only be illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

It should be noted that relational terms such as first and second are used herein to distinguish one entity or operation from another without necessarily requiring or implying any such actual relationship or sequence between the entities or operations. The terms "comprising", "comprise" or any other variations are intended to cover a non-exclusive inclusion, such that a process, a method, an article, or a device that includes a series of elements not only includes the elements, but also includes other elements not expressly listed, or elements inherent to such a process, a method, an article, or a device. In the absence of more restrictions, the elements defined by a sentence "comprising one . . . " do not exclude the presence of additional identical elements in a process, a method, an article, or a device that includes the elements.

The method and the apparatus provided in the embodiments of the disclosure are described above. The principle and implementation of specific examples of the disclosure are elaborated herein. The description of the above embodiments is merely configured to help understand the method and the core idea of the disclosure. At the same time, for those skilled in the art, in accordance with the idea of the disclosure, specific implementations and application ranges may vary. In summary, the contents of the specification shall not be understood as a limitation of the disclosure.

What is claimed is:

1. A method for processing data, performed by a terminal, comprising:
   determining whether data to be processed needs to be processed by a network-side device;
   in response to determining that the data to be processed needs to be processed by the network-side device, sending a request for establishing a connection to the network-side device, wherein, the request carries a purpose of establishing a connection, the purpose is to request the network-side device to process the data to be processed;
   determining whether the network-side device has a capability to process the data to be processed based on feedback information sent by the network-side device; and
   in response to the network-side device having the capability to process the data to be processed, sending the data to be processed to the network-side device for processing after establishing a connection with the network-side device.

2. The method of claim 1, wherein, determining whether data to be processed needs to be processed by the network-side device, comprises:
   determining a first processing latency related value of processing data to be processed by a network-side device; and
   determining whether a relationship between the first processing latency related value and a first preset threshold satisfies a preset relationship;
   wherein, in response to the relationship between the first processing latency related value and the first preset threshold satisfying the preset relationship, determining that the data to be processed needs to be processed by the work-side device.

3. The method of claim 2, wherein, the first processing latency related value comprises a processing latency or a processing speed.

4. The method of claim 1, wherein, determining whether data to be processed needs to be processed by the network-side device, comprises:
   determining whether the data to be processed needs to be processed by the network-side device based on the state information of the terminal.

5. The method of claim 4, wherein, the state information comprises at least one of:
   electric quantity, and processor load.

6. The method of claim 1, wherein, determining whether data to be processed needs to be processed by the network-side device, comprises:
   determining whether the data to be processed needs to be processed by the network-side device based on attribute information of the data to be processed.

7. The method of claim 6, wherein, the attribute information comprises at least one of:
   data volume, and data type.

8. The method of claim 1, wherein, the request further carries data volume of the data to be processed.

9. The method of claim 8, wherein, the request further carries a second preset threshold, the second preset threshold being configured for the network-side device to compare the second preset threshold with the first processing latency related value of processing the data to be processed by the network-side device, to obtain the feedback information.

10. The method of claim 1, further comprising:
    receiving processed data after the network-side device processes the data to be processed.

11. The method of claim 1, wherein, the network-side device comprises at least one of:
    a base station, and a core network.

12. A method for processing data, performed by a network-side device, comprising:
    receiving a request for establishing a connection sent by a terminal, wherein, the request carries a purpose of establishing a connection, and the purpose is to request the network-side device to process data to be processed;
    sending feedback information to the terminal based on whether having a capability to process the data to be processed;
    in response to having the capability to process the data to be processed, receiving the data to be processed after establishing a connection with the terminal;
    processing the data to be processed; and
    sending processed data to the terminal.

13. The method of claim 12, wherein, the request further carries data volume of the data to be processed, and before sending feedback information to the terminal based on whether having the capability to process the data to be processed, the method further comprises:
    determining a first processing latency related value of processing the data to be processed based on the data volume; and
    determining whether a relationship between the first processing latency related value and a second preset threshold satisfies a preset relationship;
    wherein, in response to the relationship between the first processing latency related value and the second preset threshold satisfying the preset relationship, determining having the capability to process the data to be processed.

14. The method of claim 13, wherein, the request further carries the second preset threshold.

15. The method of claim 12, wherein, in response to being incapable of processing the data to be processed, the feedback information is configured to refuse the request.

16. The method of claim 15, wherein, the feedback information further carries a reason of refusing the request.

17. The method of claim 12, wherein, the network-side device comprises at least one of:
a base station, and a core network.

18. A terminal, comprising:
a processor; and
a memory configured to store instructions executable by the processor;
wherein, the processor is configured to perform operations by executing the instructions stored in the memory, the operations comprising:
determining whether data to be processed needs to be processed by a network-side device;
in response to determining that the data to be processed needs to be processed by the network-side device, sending a request for establishing a connection to the network-side device, wherein, the request carries a purpose of establishing a connection, the purpose is to request the network-side device to process the data to be processed;
determining whether the network-side device has a capability to process the data to be processed based on feedback information sent by the network-side device; and
in response to the network-side device having the capability to process the data to be processed, sending the data to be processed to the network-side device for processing after establishing a connection with the network-side device.

19. A network-side device, comprising:
a processor; and
a memory configured to store instructions executable by the processor;
wherein, the processor is configured to perform the method for processing data of claim 12 by executing the instructions stored in the memory.

* * * * *